T. SHAW.
Steam Gage-Cock.
No. 8,772. Reissued June 24, 1879.
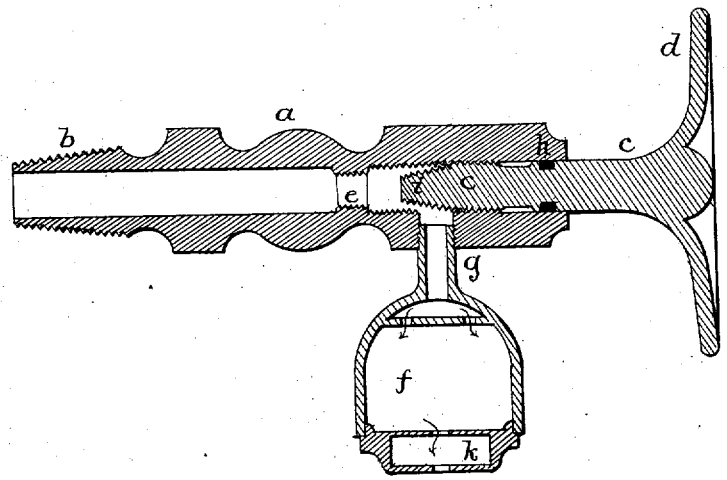
Attest:
Courtney A. Cooper
William Paxton
Inventor:
Thomas Shaw
By his attorney
Charles E. Foster
N. PETERS, PHOTO-LITHOGRAPHER, WASHINGTON, D.C.

UNITED STATES PATENT OFFICE.

THOMAS SHAW, OF PHILADELPHIA, PENNSYLVANIA.

IMPROVEMENT IN STEAM-GAGE COCKS.

Specification forming part of Letters Patent No. 65,018, dated May 21, 1867; Reissue No. 8,772, dated June 24, 1879; application filed October 11, 1867.

*To all whom it may concern:*

Be it known that I, THOMAS SHAW, of the city and county of Philadelphia, Pennsylvania, have invented a new and Improved Steam-Gage Cock; and I hereby declare the following to be a full, clear, and exact description of the same, reference being had to the accompanying drawings, and to the letters of reference marked thereon.

My invention is a valve-cock, constructed as fully described hereinafter, to insure the closing of the passage by the valve without constant regrinding of the seat.

On reference to drawing, forming part of this specification, the same represents a longitudinal vertical section of a valve-cock adapted for use with a steam-generator as a gage.

The barrel *a* is provided with a threaded end, *b*, and has a central opening, contracted at *e*, and threaded at the outer end for the reception of the threaded valve-stem *c*, at the outer end of which is a hand-wheel, *d*. The stem *c* has an annular groove for the reception of a packing, *h*, thus dispensing with the ordinary follower-cap. The inner end of the stem *c* is tapered, forming a valve, *i*, upon which is cut a screw-thread adapted to a corresponding thread in the contracted throat or seat *e* of the barrel. When the valve is forced into its seat the latter is tightly closed, and I have found that a valve of this character will more effectually close the channel against fluids under high pressure than ordinary ground valves; that leakage is not apt to occur from the wearing of the surfaces, and that the cost of construction is much less.

In using the ordinary gage-cocks it is impossible for unskilled attendants, and very difficult for experts, to determine from the sound whether the fluid passing through the cock is steam, foam, or water. I have ascertained that by combining a whistle with the cock the character of the fluid can at once be determined, and the height of the water in the boiler thus indicated. The passage of water will be accompanied with but little noise, foam will make a peculiar sound readily recognized, while the passage of steam will produce a clear, shrill note, giving immediate alarm, indicating the insufficiency of water.

The whistle *g* is detachable from the barrel and provided with a partition, *i*, with peripheral holes to avoid a central current, and with chambers *f* and *k* for imparting the needed vibrations to the fluid.

I do not here claim the whistle on the gage-cock; but

I claim—

A valve-cock provided with a threaded seat and with a stem, *c*, terminating in a conical threaded valve, *i*, substantially as and for the purpose set forth.

THOMAS SHAW. [L. S.]

Witnesses:

ELIAS J. SHAW,

E. COBB.